United States Patent
Gierak et al.

(10) Patent No.: US 8,040,784 B2
(45) Date of Patent: Oct. 18, 2011

(54) READ/WRITE TIP, HEAD AND DEVICE, AND USE THEREOF, AND METHOD FOR MANUFACTURING SAME

(75) Inventors: Jacques Gierak, Le Plessis Pate (FR); David Martrou, Ramonville (FR)

(73) Assignee: Centre National de la Recherche Scientifique, Paris (FR)

( * ) Notice: Subject to any disclaimer, the term of this patent is extended or adjusted under 35 U.S.C. 154(b) by 674 days.

(21) Appl. No.: 12/088,903

(22) PCT Filed: Oct. 5, 2006

(86) PCT No.: PCT/FR2006/002243
§ 371 (c)(1),
(2), (4) Date: Apr. 1, 2008

(87) PCT Pub. No.: WO2007/045739
PCT Pub. Date: Apr. 26, 2007

(65) Prior Publication Data
US 2008/0253020 A1    Oct. 16, 2008

(30) Foreign Application Priority Data
Oct. 21, 2005    (FR) .................................... 05 10793

(51) Int. Cl.
*G11B 9/00* (2006.01)
(52) U.S. Cl. .................................................... 369/126
(58) Field of Classification Search .................. None
See application file for complete search history.

(56) References Cited

U.S. PATENT DOCUMENTS
4,774,413 A    9/1988    Okubo et al.
5,689,494 A    11/1997   Ichikawa et al.

FOREIGN PATENT DOCUMENTS
EP      0431623      12/1991
WO      WO 96/02065   1/1996

OTHER PUBLICATIONS

Van Es, et al., An improved gallium liquid-metal ion source geometry for nanotechnology, Microelectronic Engineering 73-74, (2004); p. 132-138, cited in the application.
Culbertson, et al., Atom-probe field-ion microscopy of a high intensity gallium ion source, Journal of Vacuum Science & Technology, 17(1), Jan./Feb. 1980, © 1980 American Vacuum Society pp. 203-206.
Binnig, et al., Scanning tunneling microscopy-from birth to adolescence, Review of Modem Physics, vol. 59, No. 3, Part 1, Jul. 1987.
French Preliminary Search report for the priority French application.
Wagner, et al. Liquid gold ion source, Journal of Vacuum Science and Technology, vol. 16, No. 6, November 79, pp. 1871-1874.
Gupalo, et al., Dual scanning tunneling microscope mode of the surface diffusion metal ion source: Li transfer and scanning, Journal of Vacuum Science & Technology B (Microelectronics and Nanometer Structures) AIP for American Vacuum Society USA, Vo. 15, No. 2, Mar./Apr. 1997, pp. 491, 493-494.
Notification of Transmission of the International Research Report, European Office, Form PCT/ISA/220 (Oct. 2005).
European Office Written Opinion, Form PCT/ISA/237, Apr. 2005.
International search report for the international application, Form FR237, Jan. 2006.
Purcell, et al., Atomic-size metal-ion sources: principles and use, , Institute of Physics publishing nanotechnology, 2001, pp. 168-172.

*Primary Examiner* — Wayne Young
*Assistant Examiner* — Brian Butcher
(74) *Attorney, Agent, or Firm* — Miller, Matthias & Hull LLP (57) ABSTRACT

The invention concerns a reading/writing tip configured in the shape of a needle consisting of a core of refractory material covered with a coating of electrically conductive material, and having an outer microscope needle geometry by tunnel effect, to obtain an information concerning a surface through tunnel-effect microscopy The needle emits a charged particle from the layer of electrically conductive material, to form the surface. The tip comprises a reservoir capable of being liquefied to flow along the tip.

32 Claims, 6 Drawing Sheets

READ/WRITE TIP, HEAD AND DEVICE, AND USE THEREOF, AND METHOD FOR MANUFACTURING SAME

CROSS-REFERENCE TO RELATED APPLICATION

This application is a U.S. National Stage Application of PCT Application No. PCT FR2006/002243, filed on Oct. 5, 2006, which claims priority under the Paris Convention to French Patent Application No FR 05 10793, filed on Oct. 21, 2005.

FIELD OF DISCLOSURE

The present invention relates to the tips and the heads of read/write devices, to read/write devices, and to methods for manufacturing such devices.

BACKGROUND OF THE DISCLOSURE

The article "An improved gallium liquid-metal ion source geometry for nanotechnology", Van Es et al, Microelectronic Engineering 73-74, (2004); 132-138 describes an example of a liquid-metal ion source. Such a source generally comprises a tip configured in the shape of a needle formed of a core of a refractory material (tungsten, in this article) partially covered with a layer of electrically conductive material (gallium, in this article), said needle having a portion for connection to an electrical generator for the application of an electrical potential to the needle, said needle being adapted to be placed in an electrostatic optical system which is itself facing an electrically conductive substrate presenting a surface, said needle being adapted to emit a charged particle, of a first polarity, from the layer of electrically conductive material, in the direction of the surface of the substrate under the effect of an electrical potential difference applied by the electrical generator between the substrate and the needle, to form said surface of the substrate, said tip comprising moreover a reservoir comprising a reserve of the electrically conductive material forming said layer, said reservoir being in fluid communication with said layer, and a heat transfer device adapted to be connected to a heat generator (the electrical generator, in this article) and to liquefy the electrically conductive material contained in the reservoir to cause it to flow along the tip under the action of the heat generator.

The needle used in such methods is generally of coarse geometry (of the order of 0.4 millimeters in diameter). This makes it possible to generate an ion beam and/or to deposit accumulations of material of the order of about ten or a hundred nanometers in size on the substrate. The loss of material from the tip onto the substrate leads to an erosion which is compensated for by the flow of material from the reservoir, this material being kept fluid by the heat transfer device.

Moreover, the article "Atom-probe field-ion microscopy of a high intensity gallium ion source" by Culbertson and al. discloses a tip of the type described above, in which the ion emission is carried out at a temperature below the melting point of the material to be deposited. Thus it is possible to implement an ion emission from metals in the solid phase. For such tips, it is possible to obtain an almost atomic precision in forming the surface of the substrate. However, the autonomy of such sources remains relatively limited, due to the solid character of the material to be evaporated when it is present on the needle. This solid character prevents the flow of the material to the active site of the needle. As a result, a reservoir is not used for this type of tip Moreover, Binnig and Rohrer have shown, for example in "Scanning tunnelling microscopy—from birth to adolescence", Review of Modern Physics, vol 59, no 3, Part 1, July 1987, tunnel-effect electronic microscopes which comprise a tip connected to a generator capable of generating a potential difference between the tip and the substrate, to tear out an election at the tip. Such microscopes can determine an item of data on the surface of the substrate from the measured current flowing between the tip and the substrate.

However, each of these functions is implemented at the present time by a separate device.

SUMMARY OF THE DISCLOSURE

The invention relates principally to a read/write tip configured in the shape of a needle formed of a core of a refractory material covered at least partially with a layer of electrically conductive material, said needle having a portion for connection to an electrical generator for the application of an electrical potential to the needle, said needle being adapted to be placed in an operating position close to an electrically conductive substrate presenting a surface, said needle having an external geometrical configuration of a needle of a tunnel effect microscope, and being adapted to be connected, in a reading mode, to a detection system for obtaining an item of data relative to said surface by tunnel effect microscopy under the effect of a first electrical potential difference applied by the electrical generator between the substrate and the needle, and said needle being adapted, in a writing mode, to emit a charged particle, of a first polarity, from the layer of electrically conductive material, in the direction of the surface of the substrate under the effect of a second electrical potential difference applied by the electrical generator between the substrate and the needle, of opposite sign to that of the first potential difference, to form said surface of the substrate, said tip comprising moreover a reservoir comprising a reserve of the electrically conductive material forming said layer, said reservoir being in fluid communication with said layer, and a heat transfer device adapted, when it is activated, to liquefy the electrically conductive material contained in the reservoir to cause it to flow along the tip. The material flows by capillarity along the tip.

Thanks to these arrangements, one single tip can be used both as the tip of a tunnel effect microscope, for implementing an operation of reading the characteristics of the surface of the substrate, and as a writing tip, to form the surface of the substrate, as a source of liquid or solid metal ions. Such a tip has the advantage of being able to alternate easily between writing and reading stages, which is useful in practice for being able to locate easily the place where the writing is to be carried out, without having to use an external microscopy system.

To change from a reading function to a writing function, it is only necessary to reverse the potential difference applied between the tip and the substrate When writing in liquid-metal ion emission mode, the fluidity of the metal covering the core makes it possible to retain a tip geometry which will still be suitable for a subsequent reading.

After writing in solid metal ion emission mode (at a lower temperature), a local erosion effect can be obtained at the tip. By means of the heat transfer device, a regeneration operation of the tip can be implemented, to cause it to recover its initial geometrical configuration, suitable for the reading mode.

As a result, the invention proposes a tip capable of implementing three functions which were formerly each implemented by independent means.

In preferred embodiments of the invention it is also possible, optionally, to make use of one and/or another of the following arrangements:

the needle comprises a pointed end adapted to be placed facing said surface, said pointed end having a radius of curvature substantially comprised between 0 1 and 2 micrometers (μm);

the core comprises a tapered body with a diameter comprised between 0.1 and 0.4 millimeters (mm) which is extended by a tapered end of reducing diameter as the distance from the body increases;

the core is produced in a material having a melting point substantially higher than that of the electrically conductive material of the layer, said heat transfer device being adapted, when it is activated, to bring the needle and the reservoir to a temperature comprised between the melting points of the electrically conductive material and of the core material;

the core is produced in a columnar material having a roughness in the form of longitudinal micro-channels adapted to allow both the flow of the liquefied electrically conductive material along the core at said temperature comprised between the melting points of the electrically conductive material and of the core material, and the retention of the electrically conductive material on the core by capillarity;

the reservoir comprises a bubble of the electrically conductive material surrounding the needle in fluid communication with the layer, and the heat transfer device comprises a filament comprising:

at least one turn surrounding the needle and submerged in the reservoir of electrically conductive material, and a portion for connection to an electrical generator capable of causing an electrical power to flow in the filament so as to liquefy the electrically conductive material of the reservoir by Joule effect;

said charged particle of a first polarity is a cation.

According to another aspect, the invention relates to a head of a read/write device comprising a support bearing at least one such tip, the support comprising a first connection zone electrically connected to said needle connection portion, and adapted to be connected to an electrical generator for the application of an electrical potential to the needle According to another aspect, the invention relates to a head of a read/write device comprising a plurality of supports each bearing such a tip, each support comprising a first connection zone electrically connected to the connection portion of the respective needle, and adapted to be connected to an electrical generator for the application of an independent electrical potential to each needle.

According to another aspect, the invention relates to a read/write device comprising:

such a head of a read/write device, a sample holder adapted to receive a substrate comprising a surface portion facing each tip, a displacement system capable of generating a relative displacement of the surface and of the tips, an electrical generator connected to each tip connection portion for applying a first independent electrical potential difference between the tip in question and facing the surface portion opposite, and a second independent electrical potential difference between the tip in question and facing the surface portion, the second electrical potential difference being of sign opposite to that of the first electrical potential difference for the tip in question, said electrical generator being electrically connected to the heat transfer device for activating the latter.

In a preferred embodiment, it is also possible to provide for such a device to comprise a detection system electrically connected to the needle and adapted to obtain an item of data relative to said surface by tunnel effect microscopy under the effect of said first electrical potential difference.

According to another aspect, the invention relates to a writing method in which (a) such a read/write tip is placed in an operating position close to an electrically conductive substrate presenting a surface, (b) an electrical generator applies a second electrical potential difference between the substrate and the needle, of sign opposite to that of the first potential difference, said needle emitting a charged particle of said first polarity from the layer of electrically conductive material, in the direction of the surface of the substrate to form said substrate surface.

In particular embodiments, one and/or another of the following arrangements can also be provided:

during stage (b) the surface is formed by depositing on the surface a particle of electrically conductive metal torn from the layer of the tip under the effect of said second potential difference;

during stage (b), the heat transfer device maintains the electrically conductive material contained in the reservoir and along the tip in the solid state;

during stage (b) the surface is formed by engraving the surface by impact of a particle of electrically conductive metal torn from the layer of the tip, under the effect of said second potential difference;

during stage (b), the heat transfer device maintains the electrically conductive material contained in the reservoir and along the tip in the liquid state;

the electrical generator applies to the heat transfer device an electrical power adequate to maintain the electrically conductive material of the reservoir and of the layer in the liquid state;

during stage (a), a plurality of such read/write tips is placed in the operating position close to an electrically conductive substrate presenting a surface, each being connected to an electrical generator for the application of an independent electrical potential to each needle, and stage (b) is implemented independently for each needle;

between two successive stages (b), a relative movement is applied to the substrate and to at least one tip According to another aspect, the invention relates to a method for regeneration of such a read/write tip, in which a stage (c) is implemented, during which the heat transfer device liquefies the electrically conductive material contained in the reservoir, making the latter flow along the tip.

According to another aspect, the invention relates to a reading method in which (d) such a tip is placed in an operating position close to an electrically conductive substrate presenting a surface, (e) an electrical generator applies a first electrical potential difference between the substrate and the needle, (f) a detection system connected to said needle obtains an item of data relative to said surface by tunnel effect microscopy under the effect of said first electrical potential difference.

In an embodiment, it is also possible to provide for a relative movement to be applied to the tip and to the substrate and to reiterate stages (d), (e), and (f)

According to another aspect, the invention relates to a method of surface treatment in which at least one such reading method and a method chosen from one such writing method and one such regeneration method are implemented successively with a single tip According to another aspect, the invention relates to a computer program comprising portions of program code for the execution of the stages of such a method when said programme is executed on a computer.

According to another aspect, the invention relates to a method of manufacture of a read/write tip in which:

(z) a core of a refractory material is formed, (y) the core is coated at least partially with a layer of electrically conductive material, to form a needle a portion, being defined in said needle, for connection to an electrical generator for the application of an electrical potential to the needle, said needle being adapted to be placed in an operating position close to an electrically conductive substrate presenting a surface, (x) the external geometrical configuration of a tunnel effect microscope needle is given to the needle, said needle being adapted to he connected in a reading mode to a detection system for obtaining an item of data relative to the surface by tunnel effect microscopy under the effect of a first electrical potential difference applied by the electrical generator between the substrate and the needle, and said needle being adapted to emit, in a writing mode, a charged particle of a first polarity from the layer of electrically conductive material, in the direction of the surface of the substrate under the effect of a second electrical potential difference applied by the electrical generator between the substrate and the needle, of opposite sign to that of the first potential difference, to form said surface of the substrate, (w) a reservoir comprising a reserve of the electrically conductive material forming said layer is placed in fluid communication with said layer, and (v) a heat transfer device adapted, when activated, to liquefy the electrically conductive material contained in the reservoir and to cause it to flow along the tip, is connected to said needle.

In particular embodiments, it is also possible to provide for implementation of one and/or another of the following arrangements:

during stage (z):

(z1) the core is toughened by chemical etching, to increase the capillarity of the core to the electrically conductive material by forming longitudinal micro-channels therein, stages (w) and (y) are implemented simultaneously by immersion of the core in a bath of molten electrically conductive material, the core being provided with a filament having:

a portion for connection to an electrical generator adapted to cause an electric power, so as to liquefy the electrically conductive material of the reservoir, to flow in the filament, and at least one turn surrounding the needle and submerged in the reservoir of electrically conductive material.

Other characteristics and advantages of the invention will become apparent during the following description of one of its embodiments, given by way of a non-limitative example, with reference to the attached drawings

BRIEF DESCRIPTION OF THE DRAWING

On the drawings:

FIG. 8b shows an increase in size of the end of the first embodiment of FIG. 8a.

On the various figures, the same references denote identical or similar elements.

DETAILED DESCRIPTION

Figure 1:
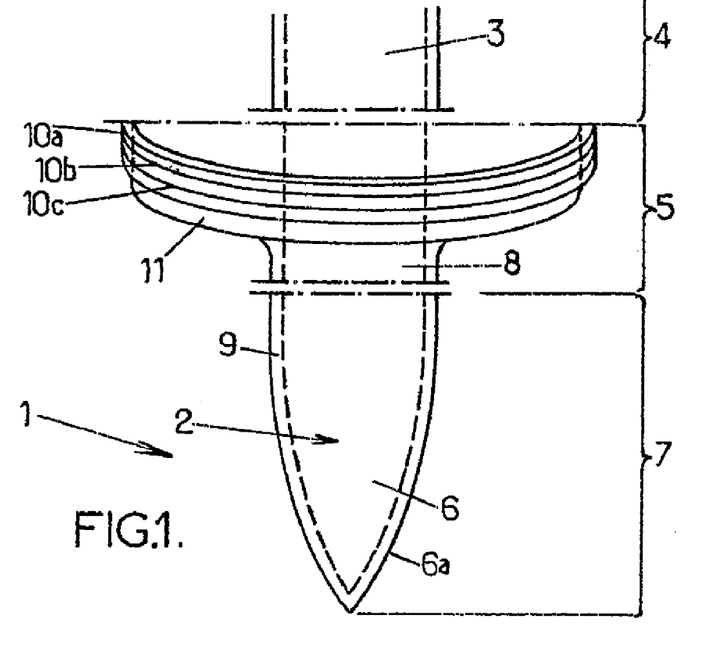
FIG. 1 is a partial diagrammatic view of a read/write tip.

FIG. 1 (not to scale, for easier understanding) shows part of a read/write tip. This tip 1 is generally in the shape of a needle 2 having an approximately cylindrical body 3 extending both in a proximal portion 4 and a median portion 5 of the tip, and a pointed end 6 extending in a distal portion 7 of the tip in an extension of the body 3. The external geometrical configuration of the pointed end 6, which extends over a few tenths of millimeters is that of a tip of a tunnel effect microscope. The terminal radius of curvature of the tip is comprised between approximately 0.1 and 2 micrometers, preferably between 0 3 and 1 micrometer, as measured by scanning microscopy. Thus, the external surface 6a of the pointed end 6 will be given the full geometrical configuration suitable for use of the read/write head as a tunnel-effect microscope needle The needle 2 comprises a long tapered core 8 of a refractory material, such as for example tungsten, covered by a fine layer 9 of an electrically conductive material, such as, for example, gold. By way of example, in the embodiment given, the core 8 is formed of a tungsten wire of 0 25 mm diameter covered at least partially, and at least in the distal portion 7, by a gold film a few microns thick.

Figure 2:
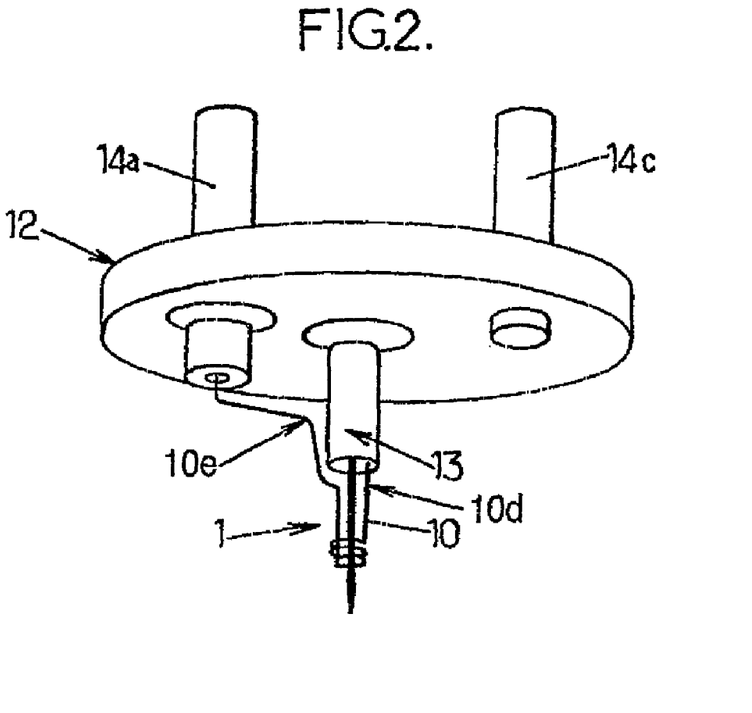
FIG. 2 is a diagrammatic perspective view of a read/write head incorporating the tip in FIG. 1.

In the median portion 5 of the tip 1 are located a few turns 10a, 10b, 10c of an electrical filament 10. These turns, numbering three in FIG. 1, by way of example, axe wound around the longitudinal axis of the needle 2 in the median portion and are for example made from a tungsten wire of approximately 0 1 mm diameter. In the example given, the turns form a circle of diameter approximately 0.5 mm which surrounds a reservoir 11 of the electrically conductive material As shown in FIG. 2, the tip 1 which has just been described is mounted on a head 12 of a read/write device such as for example a tunnel effect microscopy head with an outside diameter of a few millimeters Such a head 12 comprises for example a central capillary 13 capable of being connected to an electrical generator (not shown in FIG. 2) as well as a plurality of cross-pieces 14a, 14c electrically insulated from each other.

Figure 3:
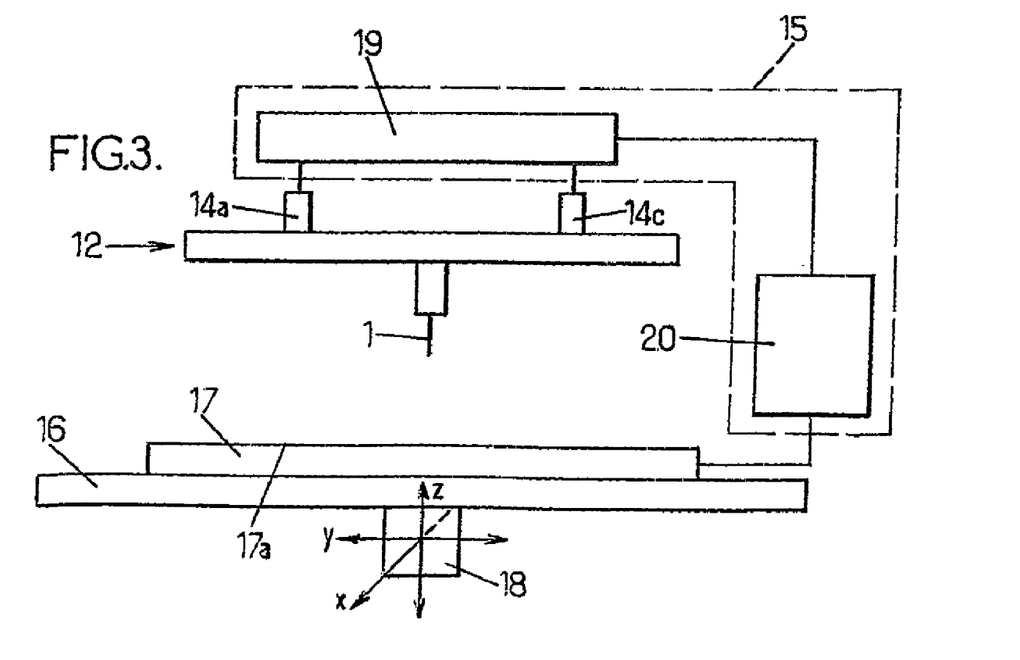
FIG. 3 is a diagrammatic view of a read/write device incorporating the head of FIG. 2.

The tip 1, shown in FIG. 1, comprising the needle 2 and the filament 10 comprising a first end 10d and a second end 10e, between which extend the turns 10a, 10b, 10c, is electrically connected to the head 12. On the one hand, the proximal portion 4 of the tip is electrically connected to the central capillary 13 powered from the first cross-piece 14a. At this point, the first end 10d of the filament 10 is electrically connected to the needle 2, to form a single point of electrical contact. In order to close the electrical heating circuit, the second end 10e of the filament 10 is electrically connected to one of the insulated cross-pieces, for example the cross-piece 14b, for example by crimping, or by spot-welding As shown in FIG. 3, the first and second cross-pieces 14a, 14c are connected to an electrical generator 15 which will be described in more detail hereafter in relation to FIGS. 4 and 5a to 5d. The cross-piece 14c, for its part, is electrically connected to the capillary 13. The read/write head 12 is placed close to a sample holder 16 which carnies a substrate 17 comprising a surface 17a oriented towards the tip 1 and intended to be read or formed by the tip 1. The distance between the tip 1 and the surface 17a is for example of the order of one hundred microns The electrical generator 15 is also electrically connected to the sample holder 16 for the application of a potential difference between the substrate 17 and the tip 1.

A displacement device 18 is capable of applying a relative movement of the surface 17a and of the tip 1 in one, two or three dimensions Such a displacement device can in standard fashion be a displacement device of the type used in tunnel effect microscopy, such as for example a device based on piezo-electric elements capable of elongating under the effect of the passage of an electrical current in the material. In the example given, as shown by the three arrows, X, Y, Z, the sample holder can be subjected to a displacement in the three directions in relation to the read/write head which remains fixed. Other variant embodiments are possible. In particular, the adjustment of the height of the tip 1 in relation to the surface 17a of the substrate can be carried out by displacing the head 12 in the direction Z in relation to the sample holder remaining fixed in this direction, while the "horizontal" displacement in the directions X or Y is carried out at the sample holder 16.

In the example given, the electrical generator 15 comprises on the one hand a current generator 19 connected to the two cross-pieces 14a and 14c to cause a heating current to flow in the filament 10. The electrical generator 15 also comprises a voltage generator 20 capable of applying a potential difference of a first sign between the tip and the substrate 17, or a potential difference of a second sign opposite to the first sign between these two elements.

Figure 4:
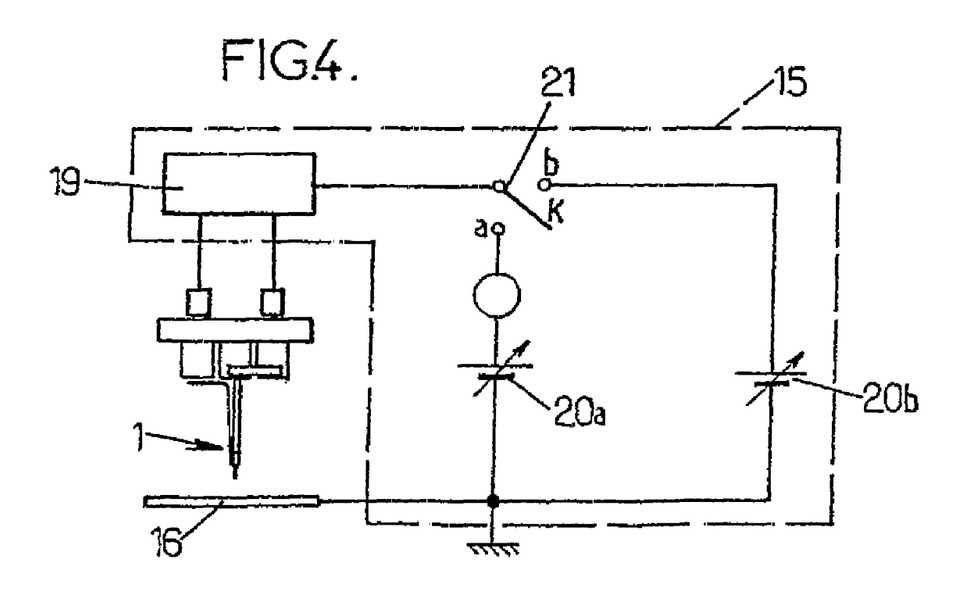
FIG. 4 is a functional diagram of the read/write device in FIG. 3, FIGS. 5a, 5b, 5c and 5d are diagrams corresponding to FIG. 4 of the read/write device, respectively in liquid-metal ion source writing mode, solid-metal ion source writing mode, in reading mode, and in regeneration mode.

Thus, it can be arranged simply to reverse the polarization of a single voltage generator. According to a variant, as shown in FIG. 4, two independent voltage generators 20a, 20b, of reverse polarity can be used A switch 21 makes it possible to control the selection of the generator 20a or the generator 20b, according to whether a position on terminal a or b of the switch is selected.

The first voltage generator 20a is capable of using the read/write device in writing mode (liquid or solid metal ion source). Thus, it is possible for example to use a generator of the type applying a positive voltage of the order of 0 to 5 kilovolts to the tip 1, the sample holder 16 being connected to earth. The current delivered by the first generator 20a is of the order of 1 to 10 microamperes for example.

Figure 5A:
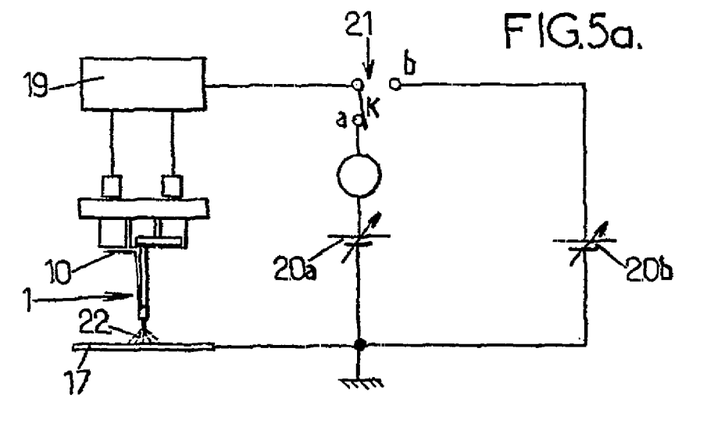

As regards the second voltage generator 20b, the latter can apply a negative voltage of the order of a few volts to the tip 1 while the sample holder 16 is connected to the substrate. A current which can be less than 1 picoamperes, up to the order of 300 nanoamps can then flow between the tip and the substrate The read/write device which has just been described can be used in writing mode as a liquid metal ion source, as shown in FIG. 5a By placing the switch 21 in the position a, the first generator 20 applies a positive potential difference of the order of a few kilovolts between the tip 1 and the substrate 17. Simultaneously, the current generator 19 activates the heat transfer device by causing an adequate current (for example of the order of a few amperes fbi the given geometrical configuration) to flow in the filament 10, to heat the electrically conductive material under the turns to a temperature at least equal to its melting point. With the given geometrical configuration, a power of 1.5 W is adequate to reach a temperature of approximately 1000° C. at the reservoir. In this mode of operation, in writing mode by liquid ion emission, a Taylor cone forms at the end of the tip, due to the opposing actions of the electrical field applied, which act to teat out ions from the tip, and the surface tension of the film of liquid metal covering the needle. The potential difference applied between the tip 1 and the substrate 17 forms a beam of ions of the electrically conductive metal of the layer 9 by field evaporation. These will form the portion of the substrate 17 opposite. The latter is for example engraved under the impact of the ions in question. Patterns of resolution of the order of one hundred nanometers can be formed in this manner. The erosion due to the extraction of material from the tip 1 is compensated for by the flow along the needle of the electrically conductive material of the reservoir 11 liquefied by the turns of the filament which transfer the energy originating from the current generator 19 The material situated at the end of the needle is thus continuously renewed, making possible the availability of a writing mode having a long service life.

Figure 5B:
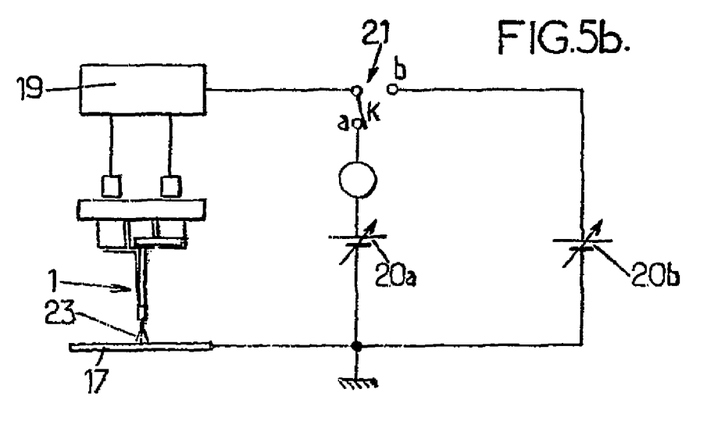

As shown in FIG. 5b, the read/write device can be used in writing mode, by emission of a solid metal ion beam 23 by placing the switch 21 in position a. In this position, the first voltage generator 20a applies a positive potential difference of a few kilovolts between the tip 1 and the substrate 17 In this mode, the current generator emits in the filament a current capable of heating the electrically conductive material of the reservoir 11 to a temperature below the melting point of this material, and typically of approximately ½ times the melting point to activate the surface diffusion effect In this mode, an ion beam 23 is torn from a site of atomic size situated at the end of the tip 1 in the direction of the substrate 17, to form the surface 17a of the latter, in order to deposit ions of the material in question thereon. The resolution of the patterns thus formed can reach a few nanometers Such a mode does not have a very long service life, due to the solid character of the layer in this mode, which prevents the flow of the material along the needle.

Figure 5C:
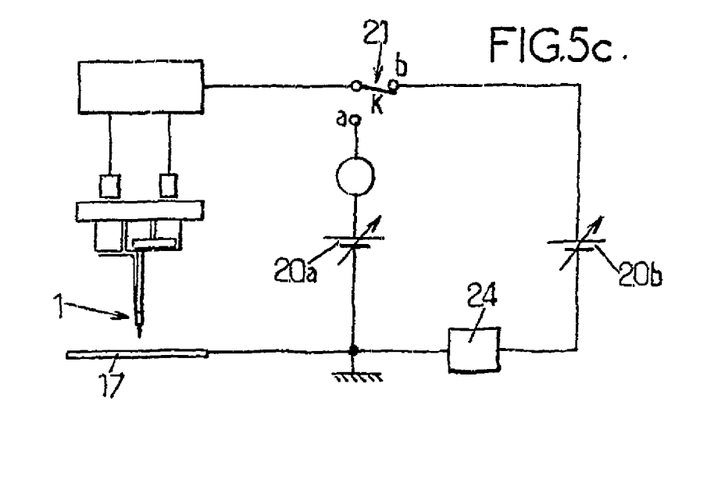

As shown in FIG. 5c, by placing the switch 21 in the position b, the second voltage generator 20b applies a negative potential difference of a few volts between the tip 1 and the substrate 17 for an operation in reading mode by tunnel effect microscopy Under the effect of this potential difference, a current of the order of one nanoampere for example flows between the tip 1 and the substrate 17, and the tip 1 then operates as a tunnel effect microscopy tip A suitable detection device 24, of the type used in tunnel effect microscopy to deduce an item of data relative to the surface 17a of the substrate 17 starting from the measured current is used for detecting this information. As such a detection device is standard in the field of tunnel effect microscopy, it will not be described in further detail here An atomic resolution can be obtained on a substrate of gallium arsenide, with the system described here.

Figure 5D:
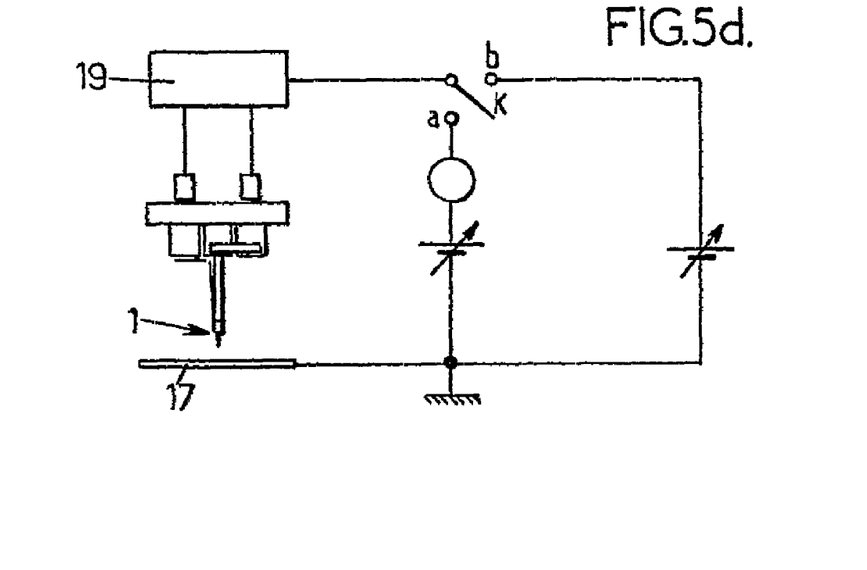

As shown in FIG. 5d, in a regeneration mode, the external geometrical configuration of the end of the needle 2 can be renewed In fact, for example following writing in solid metal ion emission mode, the end of the tip 1 may have been subjected to a severe erosion, and it is appropriate to renew the geometrical configuration of this end for the subsequent uses of the tip 1. In this mode, without applying a potential difference between the tip 1 and the substrate 17, the electrically conductive material contained in the reservoir is liquefied by heating applied by the current generator 19, to cause this material to flow along the tip until the latter recovers its original geometrical configuration.

Using the device which has just been described, it is possible for example to carry out the following surface treatment:
- the head 12 is placed facing the sample holder 16,
- in liquid metal ion emission writing mode, the alignment marks are formed by ion engraving, while optionally carrying out a relative horizontal displacement of the tip (perpendicular to the direction of ion emission) with respect to the substrate,
- during a subsequent use, in reading mode, the marks previously formed are detected, then the tip is displaced in relation to the sample 16, until reaching the place where a structure is to be formed in the substrate 16,
- in writing mode by emission of a solid metal ion beam, the surface of the substrate 17 is formed in the desired manner, then
- in regeneration mode, the external geometrical configuration of the needle 2 is regenerated for a subsequent reading or writing.

Figure 6:
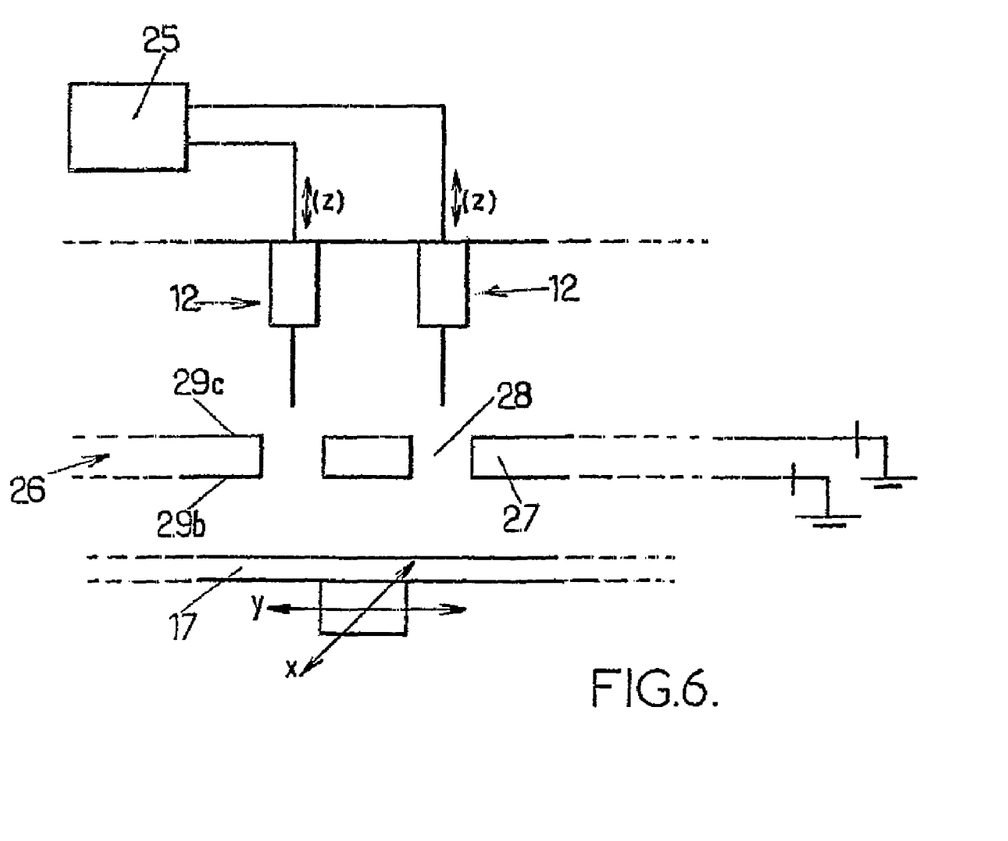
FIG. 6 is a diagram corresponding to FIG. 3 of a read/write device according to a second embodiment.

As shown in FIG. 6, a number of read/write heads 12 (2 shown in FIG. 6) can operate in parallel with regard to a single substrate 17 to form the surface of this substrate. The needles of these heads can all have the same electrically conductive material, or different deposit materials. The mode of operation of each head 12, as well as its position in the direction of emission Z, can be adjusted independently by a central unit 25 according to a pre-established method The central unit 25 can also control the displacement in the two other directions X and Y of the substrate 17 It will be noted that the automation and systematization of the operations which have just been described can be predefined and controlled by a data processing program stored in memory in the central unit 25 In the device of FIG. 6, as in the device previously described, an acceleration device 26 can be used comprising a mask 27 pierced by openings 28, for example of a few nanometers in diameter facing the needles 2. This acceleration device can also comprise electrodes 29a, 29b on the upper faces (facing the needle 2) and lower faces (facing the substrate 17) set to polarities capable of accelerating the ion beam emitted from the needle 2.

By way of possible applications of the device which has just been described, it can for example be envisaged in biology, that the substrate 17 is a biological molecule or a cell into which is introduced, or onto which is deposited, one or more atoms while in writing mode, when it is desired to assess their influence on the structure investigated, and when, following the deposit previously effected, a change in the properties of the cell investigated is detected while in reading mode. Using the device of FIG. 6, a battery of tests can thus be carried out in parallel, using very low quantities of reagents.

By way of an application, it can be envisaged to carry out a data storage on a nanometric scale by storing information on the surface in writing mode, then accessing the latter in reading mode By way of an application, it can also be envisaged in reading mode, to spot the siting of an electronic nano-component on a substrate, then, in writing mode, to form an electrical structure such as an electrical wire connecting this electronic nano-component to an external electronic component, or other, for supplying the nano-component with electrical current.

It will be noted that the regeneration function by heating can be implemented before each reading or writing operation for regenerating the external geometrical configuration of the tip, if necessary, or by using thermal evaporation to remove from the tip any impurities (for example oxides) which may have been deposited on the latter from its last use.

For the manufacture of such a tip, it is possible to start by producing a wire in a refractory material intended to form the core of the needle. A tungsten wire can for example be produced by hot-pressing tungsten powder in an extruder. The external surface of the wire thus formed is roughened to increase the capillarity of this surface This toughening can for example be carried out by electrolytic etching of the wire in a bath of sodium hydroxide for a few minutes using alternating current This stage makes it possible to form a nano-columnar structure in the surface of the core which allows the molten metal to flow along the surface and to be retained.

Figure 7A:
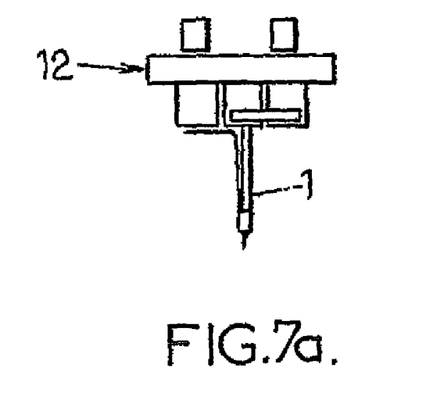
FIGS. 7a and 7b are diagrams each showing a stage of manufacture of a read/write tip.
Figure 7B:
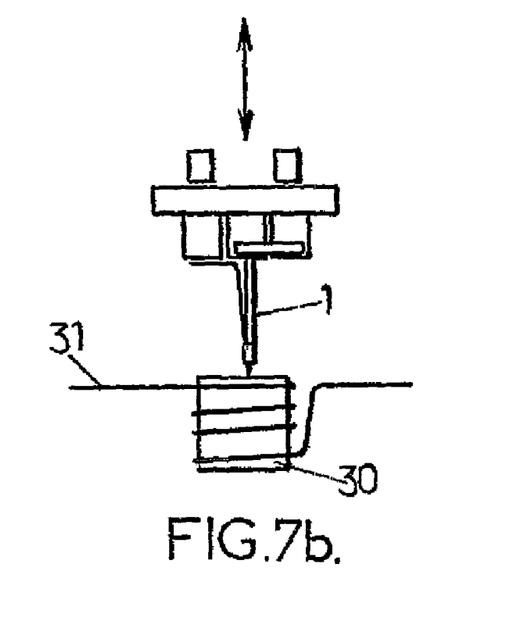

The filament is for example produced as a tungsten wire having the geometrical configuration previously described and is wound round the core, and the assembly can be fixed on the head of the device 12 such as shown in FIG. 7a. The elongated form of the distal end of the core is obtained by a suitable method, such as for example by electrochemistry. Then, after having connected the head 12 to the current generator, a heating current is caused to flow in the filament, to purify the core in particular of the oxides present at the surface of the core. Then, as shown in FIG. 7b, a crucible 30 is provided containing electrically conductive material with which it is desired to coat the core. The material in question, which will be the material deposited in writing mode, preferably has a melting point markedly below the melting point of the refractory material forming the core, such that it is possible to cause this material only to melt, by bringing it to a suitable temperature below the melting point of the core material. Also, for the electrically conductive material in question, it is possible to select a material which does not form an alloy with the refractory core material. In the example given, the crucible 30 contains gold maintained in the molten state by causing a high current to flow, for example of the order of one hundred amperes, in a filament 31 surrounding the crucible 30. By dipping the tip 1 in the crucible of molten gold, the gold is deposited by capillarity onto the core, to form the layer 9 of electrically conductive material Further, the reservoir 11 is formed by capillarity of the gold on the one hand, on the core 8 in the median portion and on the other hand on the turns 10a, 10b and 10c of the filament 10

Figure 8A:
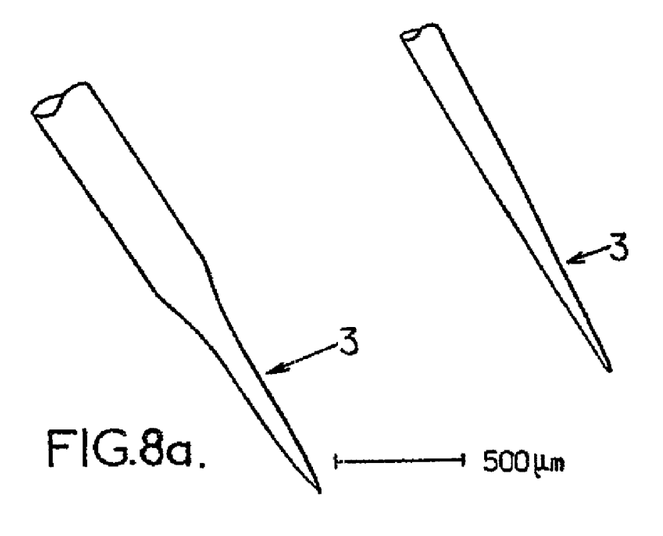
FIG. 8a shows an example of tip geometry according to two embodiments, taken by scanning election microscopy.

FIG. 8a shows, on the left, the end of a tungsten core, taken by scanning electronic microscopy, at an enlargement of ×44, the scale showing 500 microns, before immersion in a bath of molten gold, for a first concave core embodiment On the right, a convex variant embodiment is shown.

Figure 8B:
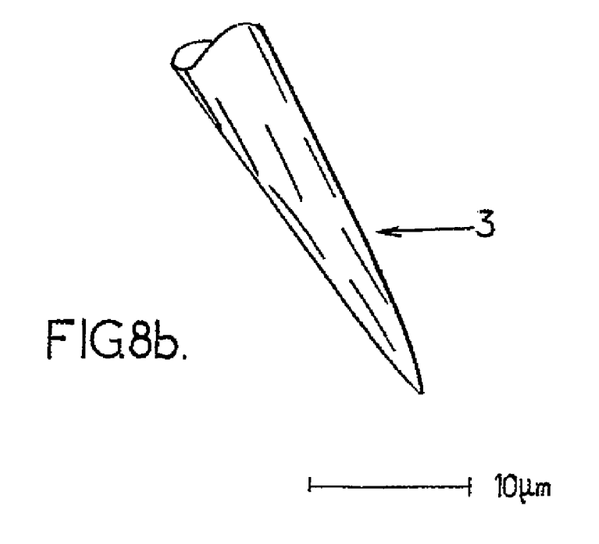

FIG. 8b shows an enlargement of the first embodiment, at an enlargement of ×2774, the scale showing 10 microns. The columnar structures formed in the core in the form of longitudinal micro-channels can be distinguished at this scale, such as shown diagrammatically by the broken lines in FIG.

8b. The liquefied electrically conductive material flows in these channels, which protects it from external contamination

The invention claimed is:

1. A read/write tip configured in the form of a needle formed of a core of a refractory material covered at least partially with a layer of electrically conductive material,
said needle having a portion for connection to an electrical generator for the application of an electrical potential to the needle,
said needle being adapted to be placed in an operating position close to an electrically conductive substrate presenting a surface,
said needle having an external geometrical configuration of a needle of a tunnel effect microscope, and being adapted to be connected, in a reading mode, to a detection system for obtaining an item of data relative to said surface by tunnel effect microscopy under the effect of a first electrical potential difference applied by the electrical generator between the substrate and the needle, and
said needle being adapted to emit, in a writing mode, a charged particle, of a first polarity, from the layer of electrically conductive material, in the direction of the surface of the substrate under the effect of a second electrical potential difference applied by the electrical generator between the substrate and the needle, of sign opposite to that of the first potential difference, to form said surface of the substrate,
said tip comprising moreover a reservoir comprising a reserve of the electrically conductive material forming said layer, said reservoir being in fluid communication with said layer, and a heat transfer device adapted, when it is activated, to liquefy the electrically conductive material contained in the reservoir to cause said electrically conductive material to flow along the tip.

2. The read/write tip according to claim 1 in which the needle comprises a pointed end adapted to be placed facing said surface, said pointed end having a radius of curvature comprised between approximately 0.1 and 2 micrometers.

3. The read/write tip according to claim 1, in which the core comprises a tapered body with a diameter comprised between 0.1 and 0.4 millimeters which is extended by a tapered end with a diameter reducing as the distance from the body increases.

4. The read/write tip according to claim 1 in which the core is produced in a material having a melting point substantially higher than that of the electrically conductive material of the layer,
said heat transfer device being adapted, when it is activated, to bring the needle and the reservoir to a temperature comprised between the melting points of the electrically conductive material and of the core material.

5. The read/write tip according to claim 4 in which the core is produced in a columnar material having a roughness in the form of longitudinal micro-channels adapted to allow both the flow of the liquefied electrically conductive material along the core at said temperature comprised between the melting points of the electrically conductive material and of the core material, and the retention of the electrically conductive material on the core by capillarity.

6. The read/write tip according to claim 1 in which the reservoir comprises a bubble of the electrically conductive material surrounding the needle in fluid communication with the layer, and in which the heat transfer device comprises a filament comprising:
at least one turn surrounding the needle and immersed in the reservoir of electrically conductive material, and
a portion for connection to an electrical generator capable of causing an electrical power to flow in the filament so as to liquefy the electrically conductive material of the reservoir by Joule effect.

7. The read/write tip according to claim 1, in which said charged particle of a first polarity is a cation.

8. A head of a read/write device comprising a support bearing at least one tip according to claim 1, the support comprising a first connection zone electrically connected to said connection portion of the needle, and adapted to be connected to an electrical generator for the application of an electrical potential to the needle.

9. A head of a read/write device comprising a plurality of supports each bearing a tip according to claim 1, each support comprising a first connection zone electrically connected to the connection portion of the respective needle, and adapted to be connected to an electrical generator for the application of an independent electrical potential to each needle.

10. A read/write device comprising:
a head of a read/write device according to claim 8,
a sample holder adapted to receive a substrate comprising a surface portion facing said at least one tip,
a displacement system capable of generating a relative displacement of the surface and of said at least one tip,
an electrical generator connected to the connection portion of said at least one tip for applying a first independent electrical potential difference between the tip in question and the facing surface portion, and a second independent electrical potential difference between the tip in question and the facing surface portion, the second electrical potential difference being of the opposite sign to that of the first electrical potential difference for the tip in question, said electrical generator being electrically connected to the heat transfer device of the tip in question, for activating said heat transfer device.

11. The read/write device according to claim 10 comprising a detection system electrically connected to the needle and adapted to obtain an item of data relative to said surface by tunnel effect microscopy under the effect of said first electrical potential difference.

12. A writing method in which
(a) a read/write tip according to claim 1 is placed in an operating position close to an electrically conductive substrate presenting a surface,
(b) an electrical generator applies a second electrical potential difference between the substrate and the needle, of sign opposite to that of the first potential difference, said needle emitting a charged particle of said first polarity from the layer of electrically conductive material, in the direction of the surface of the substrate to form said surface of the substrate.

13. The writing method according to claim 12 in which, during stage (b) the surface is formed by depositing on the surface a particle of electrically conductive metal torn out of the layer of the tip under the effect of said second potential difference.

14. The writing method according to claim 13, in which, during stage (b), the heat transfer device maintains the electrically conductive material contained in the reservoir and along the tip in the solid state.

15. The writing method according to claim 12 in which, during stage (b), the surface is formed by engraving the surface by impact of a particle of electrically conductive metal torn from the layer of the tip, under the effect of said second potential difference.

16. The writing method according to claim 15, in which, during stage (b), the heat transfer device maintains the electrically conductive material contained in the reservoir and along the tip in the liquid state.

17. The writing method according to claim 16, in which the electrical generator applies to the heat transfer device an electrical power adequate to maintain the electrically conductive material of the reservoir and of the layer in the liquid state.

18. A writing method in which,
during stage (a), a plurality of read/write tips according to claim 1 is placed in the operating position close to an electrically conductive substrate presenting a surface, each being connected to an electrical generator for the application of an independent electrical potential to each needle, and
independently for each needle, (b) an electrical generator applies a second electrical potential difference between the substrate and the needle, of sign opposite to that of the first potential difference, said needle emitting a charged particle of said first polarity from the layer of electrically conductive material, in the direction of the surface of the substrate to form said surface of the substrate.

19. The writing method according to claim 12, in which, between two successive stages (b), a movement is applied relative to the substrate and said tip.

20. A method of regeneration of a read/write tip according to claim 1, in which a stage (c) is implemented during which the heat transfer device liquefies the electrically conductive material contained in the reservoir, making said electrically conductive material flow along the tip.

21. A reading method in which
(d) a read/write tip according claim 1 is placed in an operating position close to an electrically conductive substrate presenting a surface
(e) an electrical generator applies a first electrical potential difference between the substrate and the needle,
(f) a detection system connected to said needle obtains an item of data relative to said surface by tunnel effect microscopy under the effect of said first electrical potential difference.

22. The reading method according to claim 21, in which a relative movement is applied to the tip and to the substrate, and stages (d), (e), and (f) are reiterated.

23. A method of surface treatment implemented successively with a single tip wherein a reading method is employed in which a read/write tip according claim 1 is placed in an operating position close to an electrically conductive substrate presenting a surface, an electrical generator applies a first electrical potential difference between the substrate and the needle, and a detection system connected to said needle obtains an item of data relative to said surface by tunnel effect microscopy under the effect of said first electrical potential difference; and
wherein a writing method is employed wherein the read/write tip is placed in an operating position close to the electrically conductive substrate presenting a surface, and the electrical generator applies a second electrical potential difference between the substrate and the needle of said opposite to that of the first potential difference, said needle emitting a charged particle of said first polarity from the layer of electrically conductive material in the direction of the surface of the substrate to form said surface of the substrate.

24. A non-transitory computer readable medium having embodied therein a computer program comprising portions of program code for the execution of the stages of a method according to claim 12 when said program is executed on a computer.

25. A method of manufacture of a read/write tip in which:
(z) a core of a refractory material is formed,
(y) the core is covered at least partially with a layer of electrically conductive material, to form a needle
a portion for connection to an electrical generator for the application of an electrical current to the needle, being defined in said needle,
said needle being adapted to be placed in an operating position close to an electrically conductive substrate presenting a surface,
(x) the external geometrical configuration of a tunnel effect microscope needle is given to the needle,
said needle being adapted to be connected in a reading mode to a detection system for obtaining an item of data relative to the surface by tunnel effect microscopy under the effect of a first electrical potential difference applied by the electrical generator between the substrate and the needle, and
said needle being adapted to emit, in a writing mode, a charged particle of a first polarity from the layer of electrically conductive material, in the direction of the surface of the substrate under the effect of a second electrical potential difference applied by the electrical generator between the substrate and the needle, of sign opposite to that of the first potential difference, to form said surface of the substrate,
(w) a reservoir comprising a reserve of the electrically conductive material forming said layer, is placed in fluid communication with said layer, and
(v) a heat transfer device, adapted, when it is activated, to liquefy the electrically conductive material contained in the reservoir and to cause said electrically conductive material to flow along the tip, is connected to said needle.

26. The method of manufacture of a read/write tip according to claim 25, in which during stage (z):
(z1) the core is roughened by chemical etching to increase the capillarity of the core to the electrically conductive material, forming longitudinal micro-channels therein.

27. The method of manufacture of a read/write tip according to claim 25 in which stages (w) and (y) are implemented simultaneously by immersion in a bath of electrically conductive molten material of the core provided with a filament having:
a portion for connection to an electrical generator adapted to cause an electrical power to flow in the filament so as to liquefy the electrically conductive material of the reservoir, and
at least one turn surrounding the needle and submerged in the reservoir of electrically conductive material.

28. A read/write device comprising:
a head of a read/write device according to claim 9,
a sample holder adapted to receive a substrate comprising a surface portion facing each tip,
a displacement system capable of generating a relative displacement of the surface and of the tips,
an electrical generator connected to the connection portion of each tip for applying a first independent electrical potential difference between the tip in question and the facing surface portion, and a second independent electrical potential difference between the tip in question and the facing surface portion, the second electrical potential difference being of the opposite sign to that of the first electrical potential difference for the tip in question, said electrical generator being electrically connected to the heat transfer device of the tip in question, for activating the heat transfer device.

29. A method of surface treatment implemented successively with a single tip wherein a reading method is employed which a read/write tip according claim 1 is placed in an operating position close to an electrically conductive substrate presenting a surface, an electrical generator applies a first electrical potential difference between the substrate and the needle, and a detection system connected to said needle obtains an item of data relative to said surface by tunnel effect microscopy under the effect of said first electrical potential difference, and wherein a regeneration method is employed wherein the heat transfer device liquefies the electrically conductive material contained in the reservoir, making said electrically conductive material flow along the tip.

30. A non-transitory computer readable medium having embodied therein a computer program comprising portions of program code for the execution of the stages of a method according to claim 20 when said program is executed on a computer.

31. A non-transitory computer readable medium having embodied therein a computer program comprising portions of program code for the execution of the stages of a method according to claim 21 when said program is executed on a computer.

32. A non-transitory computer readable medium having embodied therein a computer program comprising portions of program code for the execution of the stages of a method according to claim 23 when said program is executed on a computer.

* * * * *